(12) United States Patent
Higuchi et al.

(10) Patent No.: US 9,753,347 B2
(45) Date of Patent: Sep. 5, 2017

(54) ELECTROCHROMIC GEL, METHOD FOR PRODUCING THE GEL, METHOD FOR CONTROLLING ELECTRONIC PRINTING AND ERASING ON ELECTROCHROMIC GEL, AND STRETCHABLE DISPLAY

(71) Applicant: NATIONAL INSTITUTE FOR MATERIALS SCIENCE, Ibaraki (JP)

(72) Inventors: Masayoshi Higuchi, Ibaraki (JP); Jian Zhang, Ibaraki (JP)

(73) Assignee: NATIONAL INSTITUTE FOR MATERIALS SCIENCE, Ibaraki (JP)

( * ) Notice: Subject to any disclaimer, the term of this patent is extended or adjusted under 35 U.S.C. 154(b) by 0 days.

(21) Appl. No.: 14/364,126

(22) PCT Filed: Jan. 30, 2013

(86) PCT No.: PCT/JP2013/052103
§ 371 (c)(1),
(2) Date: Jun. 10, 2014

(87) PCT Pub. No.: WO2013/115277
PCT Pub. Date: Aug. 8, 2013

(65) Prior Publication Data
US 2014/0333982 A1   Nov. 13, 2014

(30) Foreign Application Priority Data
Jan. 30, 2012   (JP) .................................. 2012-016036

(51) Int. Cl.
*G02F 1/15*   (2006.01)
*G02F 1/1333*   (2006.01)
(Continued)

(52) U.S. Cl.
CPC ................ *G02F 1/15* (2013.01); *B41J 2/385* (2013.01); *G02F 1/133305* (2013.01);
(Continued)

(58) Field of Classification Search
CPC ...... B41J 2/385; G02F 1/133305; G02F 1/15; G02F 1/153; G02F 2001/1515;
(Continued)

(56) References Cited

U.S. PATENT DOCUMENTS 4,188,095 A * 2/1980 Nishimura ............ G02F 1/1341
216/23
2003/0214612 A1  11/2003 Freeman
(Continued)

FOREIGN PATENT DOCUMENTS

JP      11-183944      7/1999
JP      2005-526296    9/2005
(Continued)

OTHER PUBLICATIONS

International Search Report issued Apr. 23, 2013 in International (PCT) Application No. PCT/JP2013/052103.

*Primary Examiner* — Scott J Sugarman
*Assistant Examiner* — Vipin Patel
(74) *Attorney, Agent, or Firm* — Wenderoth, Lind & Ponack, L.L.P.

(57) ABSTRACT

The problem to be solved by the present invention is to provide an electrochromic gel which is excellent in flexibility and which is stretchable, a method for producing the gel, a method for controlling electronic printing and erasing, and a stretchable display. The problem is solved by using an electrochromic gel obtained by laminating an electrolyte-containing gel layer consisting only of an electrolyte-containing gel and an organic-metallic hybrid polymer-containing layer obtained by containing an organic-metallic hybrid polymer in the electrolyte-containing gel.

13 Claims, 6 Drawing Sheets

(51) Int. Cl.
*B41J 2/385* (2006.01)
*G02F 1/153* (2006.01)

(52) U.S. Cl.
CPC ...... *G02F 1/153* (2013.01); *G02F 2001/1515* (2013.01); *G02F 2001/1519* (2013.01); *Y10T 428/31507* (2015.04); *Y10T 428/31935* (2015.04); *Y10T 428/31938* (2015.04)

(58) Field of Classification Search
CPC ..... G02F 2001/1519; Y10T 428/31507; Y10T 428/31935; Y10T 428/31938
USPC .......... 359/265–273; 428/689–690; 252/582, 252/583, 586
See application file for complete search history.

(56) References Cited

U.S. PATENT DOCUMENTS

| | | | |
|---|---|---|---|
| 2004/0061097 A1* | 4/2004 | Kloeppner | C09K 9/02 252/583 |
| 2009/0270589 A1 | 10/2009 | Higuchi et al. | |
| 2012/0127554 A1* | 5/2012 | Higuchi | C07D 213/22 359/270 |
| 2012/0194894 A1* | 8/2012 | Yashiro | C09K 9/02 359/270 |

FOREIGN PATENT DOCUMENTS

| | | | | |
|---|---|---|---|---|
| JP | 2007/112769 | | 5/2007 | |
| JP | 2007-112957 | | 5/2007 | |
| JP | 2008-162967 | | 7/2008 | |
| JP | 2008-162976 | | 7/2008 | |
| JP | 2008-162979 | | 7/2008 | |
| JP | 2009/223159 | | 10/2009 | |
| JP | 2009223159 A | * | 10/2009 | |
| JP | 2009-265437 | | 11/2009 | |
| JP | WO 2010147017 A1 | * | 12/2010 | .......... C07D 213/22 |
| WO | 2007/049371 | | 5/2007 | |
| WO | 2008/081762 | | 7/2008 | |
| WO | 2008/143324 | | 11/2008 | |
| WO | 2010/147017 | | 12/2010 | |

* cited by examiner

ELECTROCHROMIC GEL, METHOD FOR PRODUCING THE GEL, METHOD FOR CONTROLLING ELECTRONIC PRINTING AND ERASING ON ELECTROCHROMIC GEL, AND STRETCHABLE DISPLAY

TECHNICAL FIELD

The present inventions relate to an electrochromic gel, a method for producing the gel, a method for controlling electronic printing and erasing on the electrochromic gel, and a stretchable display.

In particular, they relate to an electrochromic gel having an organic-metallic hybrid polymer capable of coloring and decoloring in a stretchable gel (soft electrolyte layer), a method for producing the gel, a method for controlling electronic printing and erasing on the electrochromic gel, and a stretchable display.

BACKGROUND ART

An electronic paper display permits rolling of an electronic information display medium itself like paper, and permits electronic printing and erasing, and it is a display capable of maintaining an electronic printing display without needing electric power.

As such an electronic paper display, for example, displays employing the principles of a particle movement type, a phase change type, a heat sensitive dyestuff type, and a liquid crystal type have been proposed.

However, these types have a complicated device structure and become expensive, and have difficulty in processing into a thin medium. Furthermore, coloring is also difficult.

The present inventors have disclosed an electrochromic element using an organic-metallic hybrid polymer in which a plurality of bis(terpyridine)s are linked to each other via metallic ions of Fe, Co, and Ru et al. (Patent Literature 3), and have proposed applying of the electronic paper display (see, Patent Literatures 1 to 10). Recently, the present inventors have developed an electronic printed medium in which the organic-metallic hybrid polymer has been printed onto a PET film.

However, the electrochromic element has a structure in which an organic-metallic hybrid polymer layer and a gel electrolyte layer are laminated and the laminated product is sandwiched by electrode layers from the both sides (see FIG. 3 of Patent Literature 3), and has a problem that the presence of the electrode layer causes poor flexibility.

Similarly, the electronic printed medium also has a problem that it has a structure obtained by removing a gel electrolyte layer and an electrode layer at a gel electrolyte layer side from the electrochromic element structure, so that it has poor flexibility due to the presence of the electrode layer.

CITATION LIST

Patent Literatures

Patent Literature 1: WO 2007/049371 A
Patent Literature 2: JP 2007-112769 A
Patent Literature 3: JP 2007-112957 A
Patent Literature 4: WO 2008/081762 A
Patent Literature 5: JP 2008-162967 A
Patent Literature 6: JP 2008-162976 A
Patent Literature 7: JP 2008-162979 A
Patent Literature 8: WO 2008/143324 A
Patent Literature 9: JP 2009-223159 A
Patent Literature 10: JP 2009-265437 A

SUMMARY OF INVENTION

Technical Problem

The present invention addresses the problem of providing an exceptionally flexible and stretchable electrochromic gel, a method for producing the gel, a method for controlling electronic printing and erasing on the electrochromic gel, and a stretchable display.

Solution to Problem

Under the above-mentioned circumstances, the present inventors have made trials and errors to find that an electrochromic gel having an organic-metallic hybrid polymer capable of coloring and decoloring in a stretchable gel (soft electrolyte layer) can carry out electronic printing or erasing by reversibly coloring or decoloring by electric field application control, can maintain an electronic printed display for several hours without supplying electric power, and has excellent flexibility, so that the electronic information display medium itself can be rolled like paper, and, in addition, that the electronic information display medium itself is stretchable and, therefore, can function as a new stretchable electronic information display medium, and have completed the present invention.

The present invention has the following configurations.

(1) An electrochromic gel comprising an electrolyte-containing gel layer consisting only of an electrolyte-containing gel; and an organic-metallic hybrid polymer-containing layer which comprises an organic-metallic hybrid polymer contained in an electrolyte-containing gel, wherein the electrolyte-containing gel layer and the organic-metallic hybrid polymer-containing layer are laminated onto each other.

(2) The electrochromic gel of (1), wherein the electrolyte-containing gel comprises a polymer gel containing an organic solvent and an inorganic electrolyte dispersed into said polymer gel.

(3) The electrochromic gel of (1) or (2), wherein the organic-metallic hybrid polymer is represented by the following formula (I):

[Chemical Formula 1]

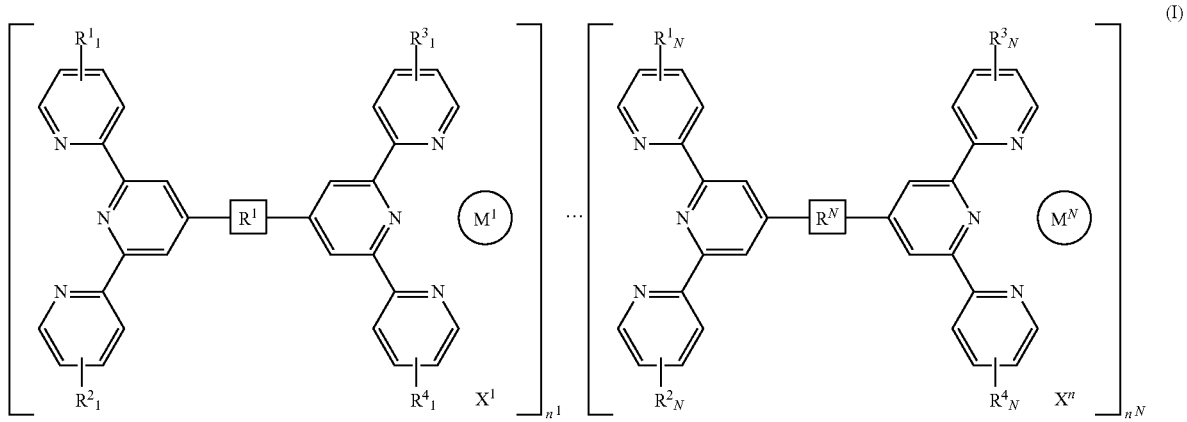

wherein $M^1$ to $M^N$ (N denotes an integer of 2 or more) denote a plurality of types of metal ions having different redox potential from each other, $X^1$ to $X^n$ (n denotes an integer of 2 or more) denote, independently for each occurrence, a counter anion, $R^1$ to $R^N$ (N denotes an integer of 2 or more) denote, independently for each occurrence, a spacer including a carbon atom and a hydrogen atom or a spacer directly connecting two terpyridyl groups to each other, $R^1_1$ to $R^1_N$, $R^2_1$ to $R^2_N$, $R^3_1$ to $R^3_N$, and $R^4_1$ to $R^4_N$ (N denotes an integer of 2 or more) denote, independently for each occurrence, a hydrogen atom or a substituent group, and $n^1$ to $n^N$ denote an integer of 2 or more showing independently a polymerization degree.

(4) The electrochromic gel of (3), wherein the organic-metallic hybrid polymer is a Fe-MEPE polymer.

(5) The electrochromic gel of (2), wherein the inorganic electrolyte has electrolytic conductivity of 0.2 S/m or more.

(6) The electrochromic gel of (5), wherein the inorganic electrolyte is any one of lithium salt, sodium salt, potassium salt, ammonium salt or compounds thereof.

(7) The electrochromic gel of (2), wherein a polymer constituting the polymer gel is any one of poly(methacrylic acid ester)s such as poly(methyl methacrylate), poly(ethyl methacrylate), poly(butyl methacrylate), poly(cyclohexyl methacrylate), and poly(phenyl methacrylate), and polycarbonates.

(8) The electrochromic gel of (2), wherein the organic solvent is any one of propylene carbonate, ethylene carbonate, and diethyl carbonate.

(9) A method for producing an electrochromic gel, which comprises:

Step S1 of forming a polymer film consisting of an organic-metallic hybrid polymer to a thickness of less than 1 μm, in which an organic-metallic hybrid polymer solution is prepared, the organic-metallic hybrid polymer solution is coated onto a flat surface, and the solution is dried, Step S2 of coating an electrolyte-containing gel onto one surface of the polymer film to a thickness of not less than 10 μm and not more than 1 cm, in which an electrolyte-containing coating gel including an organic solvent is prepared and is coated onto the polymer film, and Step S3 of forming an organic-metallic hybrid polymer-containing layer comprising the electrolyte-containing gel and the organic-metallic hybrid polymer contained in said gel, in which a laminated body of the polymer film and the electrolyte-containing gel is maintained at room temperature in the air so as to volatilize a predetermined amount of the organic solvent in the electrolyte-containing coating gel, and the polymer film is inmmersed into the other surface side of the electrolyte-containing coating gel.

(10) The method for producing an electrochromic gel of (9), wherein the electrolyte-containing coating gel including the organic solvent in Step S2 is prepared by dispersing a polymer which is any one of poly(methacrylic acid ester)s such as poly(methyl methacrylate), poly(ethyl methacrylate), poly(butyl methacrylate), poly(cyclohexyl methacrylate), and poly(phenyl methacrylate), and polycarbonates, and an inorganic electrolyte which is any one of lithium salt, sodium salt, potassium salt, ammonium salt or compounds thereof, into an organic solvent which is any one of propylene carbonate, ethylene carbonate, and diethyl carbonate.

(11) The method for producing an electrochromic gel of (9) or (10), wherein the electrolyte-containing coating gel including the organic solvent in Step S2 is prepared such that an amount of the organic solvent in the electrolyte-containing coating gel is 65 weight % or less.

(12) A method for controlling electronic printing onto the electrochromic gel of any one of claims 1 to 8 and erasing, which comprises connecting a first electrode to the organic-metallic hybrid polymer-containing layer and connecting a second electrode to the electrolyte-containing gel layer, then applying an electric field between the two electrodes so as to oxidize and reduce the organic-metallic hybrid polymer in a region of the electrolyte-containing gel layer to which the first electrode is connected, so that oxidization de-colors the region and reduction colors the region, thereby carrying out the electronic printing and erasing.

(13) A stretchable display comprising an electrochromic gel of any one of (1) to (8), a bendable frame holding the electrochromic gel, and a band attached to the frame.

Advantageous Effects of Invention

Since an electrochromic gel of the present invention has a laminated structure of an electrolyte-containing gel layer consisiting only of an electrolyte-containing gel, and an organic-metallic hybrid polymer-containing layer comprising an electrolyte-containing gel and an organic-metallic hybrid polymer contained in said gel, it can carry out electronic printing and erasing on the electrochromic gel by reversibly coloring or decoloring the organic-metallic hybrid polymer by electric field application control. Furthermore, display of the electronic printing can be maintained for several hours without supplying electric power. Furthermore, the electrochromic gel has excellent flexibility, and electronic information display medium itself can be rolled like a paper medium. Furthermore, the electrochromic gel is stretchable, so that it can be used as a new stretchable electronic information display medium.

The method for producing the electrochromic gel comprises a step of forming a polymer film consisting of an organic-metallic hybrid polymer to a thickness of less than 1 µm, in which an organic-metallic hybrid polymer solution is prepared, the organic-metallic hybrid polymer solution is coated onto a flat surface, and the solution is dried, a step of coating an electrolyte-containing gel onto one surface of the polymer film to a thickness of not less than 10 µm and not more than 1 cm, in which an electrolyte-containing coating gel including an organic solvent is prepared and is coated onto the polymer film, and a step of forming an organic-metallic hybrid polymer-containing layer comprising the electrolyte-containing gel and the organic-metallic hybrid polymer contained in said gel, in which a laminated body of the polymer film and the electrolyte-containing gel is maintained at room temperature in the air so as to volatilize a predetermined amount of the organic solvent in the electrolyte-containing coating gel, and the polymer film is inmmersed into the other surface side of the electrolyte-containing coating gel, and hence the electrochromic gel of the present invention can be easily produced. Furthermore, since the electrochromic gel has a simple structure, it can be produced easily, thus reducing the manufacturing cost.

A method for controlling electronic printing and erasing on an electrochromic gel according to the present invention is a method for controlling the electronic printing and erasing on the above-described electrochromic gel. That is the method comprises connecting a first electrode to the organic-metallic hybrid polymer-containing layer and connecting a second electrode to the electrolyte-containing gel layer, then applying an electric field between the two electrodes so as to oxidize and reduce the organic-metallic hybrid polymer in a region of the electrolyte-containing gel layer to which the first electrode is connected, so that oxidization de-colors the region and reduction colors the region, thereby carrying out the electronic printing and erasing. Therefore, the method permits easily coloring or decoloring the organic-metallic hybrid polymer so as to carry out electronic printing and erasing on the electrochromic gel.

The stretchable display of the present invention comprises the above-described electrochromic gel, a bendable frame holding the electrochromic gel, and a band attached to the frame. Then, not only the band but also the frame and the electrochromic gel itself as a display can be attached so as to be fitted to the curve of a human body.

Figure 1:
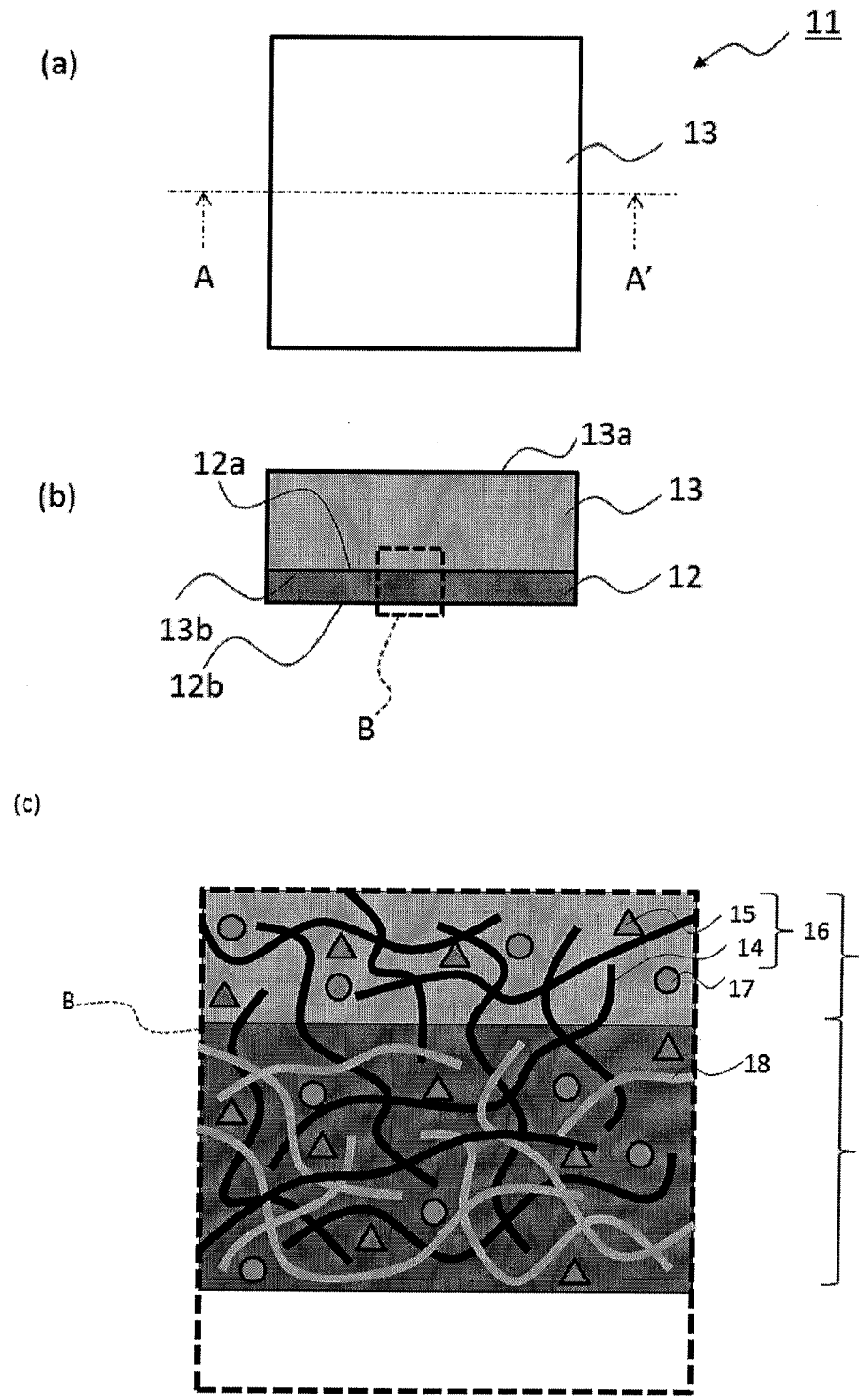
FIG. 1 is a view showing one example of an electrochromic gel of the present invention.

DESCRIPTION OF EMBODIMENTS (Embodiments of the Present Invention)
Hereinafter, embodiments of an electrochromic gel, a method for producing for the gel, a method for controlling electronic printing and erasing on the electrochromic gel, and a stretchable display are described with reference to the attached drawings.
<Electrochromic Gel>
Firstly, an embodiment of the electrochromic gel of the present invention is described.
FIG. 1 is a view showing one example of an electrochromic gel of the present invention. FIG. 1(a) is a plan view thereof, FIG. 1(b) is a sectional schematic view taken on line A-A' of FIG. 1(a), and FIG. 1(c) is an enlarged schematic view in a B part of FIG. 1(b).
As shown in FIG. 1(a), the electrochromic gel 11 has a substantially rectangular in a plan view. However, the shape is not limited to this, and the shape may be circular shape or an elliptical in it plan view.
As shown in FIG. 1(b), the electrochromic gel 11 is obtained by laminating an electrolyte-containing gel layer 13 and an organic-metallic hybrid polymer-containing layer 12 onto each other.
A first surface 12a of the organic-metallic hybrid polymer-containing layer 12 and a second surface 13b of the electrolyte-containing gel layer 13 are fixed to each other.
On the other hand, a second surface 12b of the organic-metallic hybrid polymer-containing layer 12 and a first surface 13a of the electrolyte-containing gel layer 13 are exposed to the outside.
As shown in FIG. 1(c), the electrolyte-containing gel layer 13 consists only of an electrolyte-containing gel.
The electrolyte-containing gel is formed by dispersing an inorganic electrolyte 17 into a polymer gel 16 which is gelled by adding an organic solvent 15 into a polymer 14.
The organic-metallic hybrid polymer-containing layer 12 is formed by containing an organic-metallic hybrid polymer 18 in an electrolyte-containing gel. That is, it is formed by containing the organic-metallic hybrid polymer 18 in the electrolyte-containing gel formed by dispersing an inorganic electrolyte 17 into a polymer gel 16 which is gelled by adding an organic solvent 15 into a polymer 14. Since the organic-metallic hybrid polymer 18 is taken into the electrolyte-containing gel, the organic-metallic hybrid polymer-containing layer 12 is not easily peeled off from the electrolyte-containing gel layer 13.
Preferable example of the organic solvent 15 is any of propylene carbonate, ethylene carbonate, and diethyl carbonate. By using such an organic solvent, it is possible to form an electrolyte-containing gel having high viscosity, thus enabling the organic-metallic hybrid polymer-containing layer 12 to be formed on only one surface side of the electrolyte-containing gel. In the case of using an organic solvent such as acetonitrile, the gel is a liquid form and it may be difficult to form the organic-metallic hybrid polymer-containing layer 12 on only one surface. However, by heating this liquid gel with a heater or the like, the contained organic solvent such as acetonitrile is evaporated and removed, and it is possible to form an electrolyte-containing gel having high viscosity.

It is preferable that the polymer 14 is selected from the group consisting of poly(methacrylic acid ester)s such as poly(methyl methacrylate) (PMMA), poly(ethyl methacrylate), poly(butyl methacrylate), poly(cyclohexyl methacrylate), and poly(phenyl methacrylate), and polycarbonates.

These polymers are swollen in the organic solvent and easily gelled.

It is preferable that the inorganic electrolyte 17 is soluble in the organic solvent. Thus, the inorganic electrolyte 17 can be easily dispersed in the gelled polymer layer.

Furthermore, it is preferable that the electrolytic conductivity of the inorganic electrolyte 17 is 0.2 S/m or more. Thus, electrophoresis can be easily carried out in the gelled polymer layer, and thus the inorganic electrolyte 17 can be supplied to the organic-metallic hybrid polymer 18 from electrolyte-containing gel to one surface side.

Examples of such an inorganic electrolyte 17 include lithium salt, sodium salt, potassium salt, ammonium salt or compounds thereof.

Examples of the compound of the salt include lithium perchlorate ($LiClO_4$), lithium borate tetrafluoride, lithium phosphate hexafluoride, lithium trifluorophosphate, lithium arsenate hexafluoride, ammonium perchlorates such as tetrabutyl ammonium perchlorate, tetraethyl ammonium perchlorate, and tetrapropyl ammonium perchlorate, and hexafluorophosphates such as tetrabutyl ammonium hexafluorophosphate, tetraethyl ammonium hexafluorophosphate, and tetrapropyl ammonium hexafluorophosphate.

As described above, for example, the electrolyte-containing gel layer 13 may contain $LiClO_4$ as the inorganic electrolyte 17, propylene carbonate as the organic solvent 15 and can include PMMA as the polymer 14.

The organic-metallic hybrid polymer 18 is a polymer in which an organic compound having coordinating property and a metal ion are alternately linked to each other by complexing, and can use well-known polymer. Patent Literatures 3 to 10 report such polymers.

One example of the organic-metallic hybrid polymer 18 may be a polymer including a bis(terpyridine) derivative, a metal ion, and a counter anion. More specifically, it may be a polymer represented by the above-described formula (I).

The organic-metallic hybrid polymer 18 represented by formula (I) may be a bis(terpyridine) derivative having coordinating property, a metal ion, and a counter anion, and may be a polymer which forms a polymer complex in which the bis(terpyridine) derivative and the metal ion are alternately linked to each other.

In formula (I), $M^1$ to $M^N$ (N denotes an integer of 2 or more) denote a plurality of types of metal ions having different redox potential from each other, $X^1$ to $X^n$ (n denotes an integer of 2 or more) denote, independently for each occurrence, a counter anion, $R^1$ to $R^N$ (N denotes an integer of 2 or more) denote, independently for each occurrence, a spacer including a carbon atom and a hydrogen atom or a spacer directly connecting two terpyridyl groups to each other, $R^1_1$ to $R^1_N$, $R^2_1$ to $R^2_N$, $R^3_1$ to $R^3_N$, and $R^4_1$ to $R^4_N$ (N denotes an integer of 2 or more) denote, independently for each occurrence, a hydrogen atom or a substituent group, and $n^1$ to $n^N$ denote an integer of 2 or more showing independently a polymerization degree.

In formula (I), the metal ions $M^1$ to $M^N$ are at least one selected from an iron ion, a cobalt ion, a nickel ion, a zinc ion, and a ruthenium ion. These metal ions can change valency by reduction reaction. Furthermore, the organic-metallic hybrid polymer has different redox potential depending upon respective metal ions.

In formula (I), the counter anion $X^1$ to $X^n$ is at least one selected from an acetic acid ion, a chlorine ion, a phosphorus hexafluoride ion, a boron tetrafluoride ion, and polyoxometalate. The counter anion compensates the electric charge of the metal ion, and makes the organic-metallic hybrid polymer to be electrically neutral.

In formula (I), the spacer $R^1$ to $R^N$ is a spacer for connecting two terpyridyl groups to each other, and the spacer can arbitrarily set an angel of a pyridyl group of the organic-metallic hybrid polymer.

The spacers $R^1$ to $R^N$ denote a spacer independently containing a carbon atom and a hydrogen atom, or a spacer directly connecting two terpyridyl groups to each other.

Examples of the spacer including a carbon atom and a hydrogen atom may be a divalent organic group including a carbon atom and a hydrogen atom. Examples of the divalent organic group may be an aliphatic hydrocarbon group, an alicyclic hydrocarbon group, an aromatic hydrocarbon group, and a heterocyclic group. Among them, an arylene group such as a phenylene group and a biphenylene group is preferable. Furthermore, these hydrocarbon groups may be substituent groups including an alkyl group such as a methyl group, an ethyl group and a hexyl group, an alkoxyl group such as a methoxy group and a butoxy group, and halogen atoms such as chlorine and bromine.

Furthermore, such a spacer may include an oxygen atom and sulfur atom.

For example, the spacer including divalent arylene groups represented by the following formulae (1) to (11) may be preferable.

[Chemical Formula2]

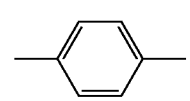

(1)

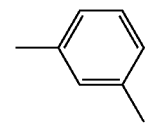

(2)

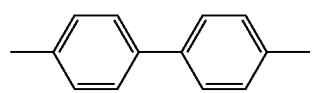

(3)

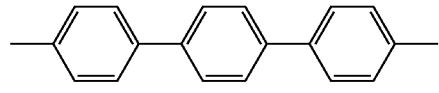

(4)

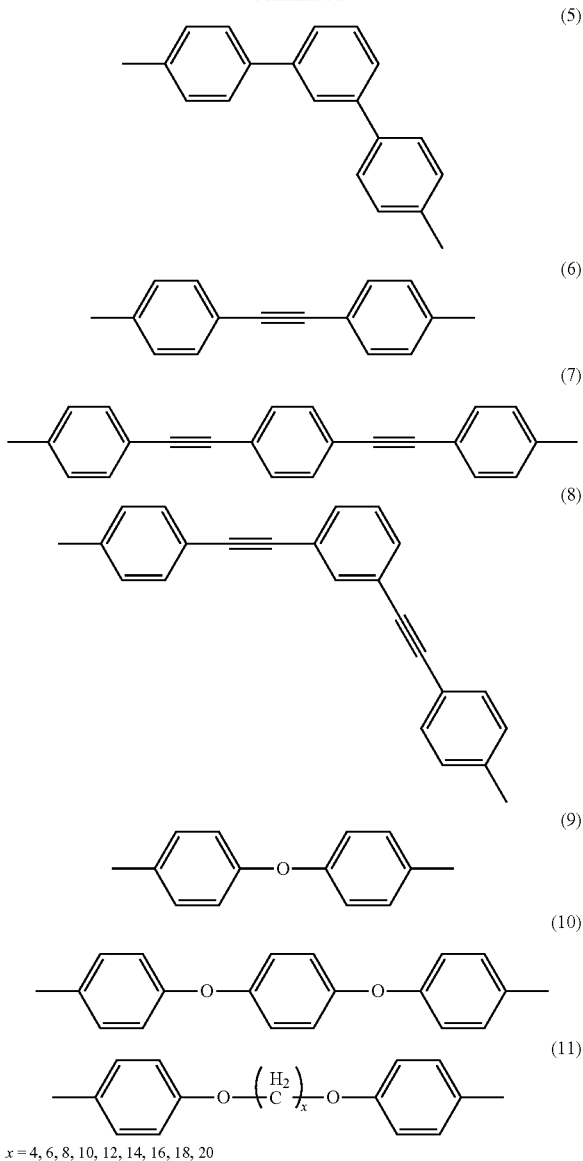

x = 4, 6, 8, 10, 12, 14, 16, 18, 20

Examples of the aliphatic hydrocarbon group constituting the spacer may be $C_1$-$C_6$ alkyl groups. Specifically, the examples may be a methyl group, an ethyl group, an n-propyl group, an i-propyl group, an n-butyl group, a t-butyl group, and the like.

Furthermore, examples of the divalent organic group constituting the spacer may be the above-mentioned aliphatic hydrocarbon group having substituents including an alkyl group such as a methyl group, an ethyl group and a hexyl group, an alkoxyl group such as a methoxy group and a butoxy group, and halogen atoms such as chlorine and bromine.

Examples of the preferable organic-metallic hybrid polymer 18 may be an organic-metallic hybrid polymer (Fe-MEPE polymer) obtained by complexing bis(terpyridyl) benzene and an iron ion.

<Method for Producing Electrochromic Gel>

A method for producing an electrochromic gel in accordance with the embodiment of the present invention comprises Step S1 of forming a polymer film, Step S2 of coating the electrolyte-containing coarting gel, and Step S3 of forming an organic-metallic hybrid polymer-containing layer.

Figure 2:
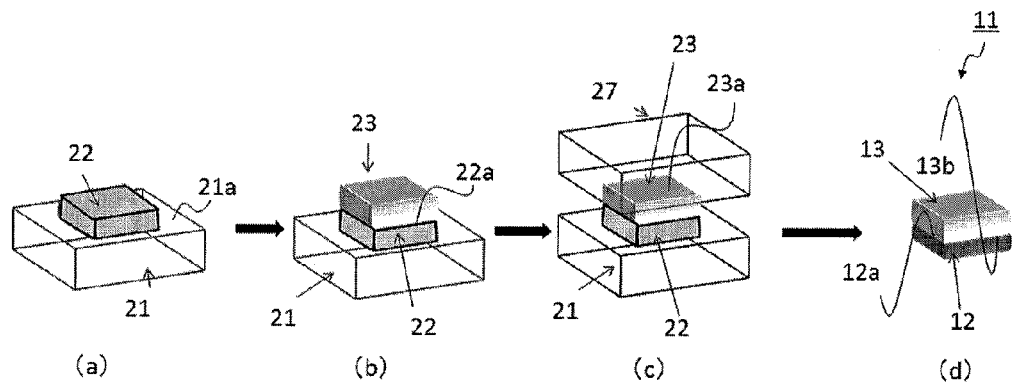
FIG. 2 is a process chart showing one example of a method for producing the electrochromic gel of the present invention.

FIG. 2 is a process chart showing one example of the method for producing an electrochromic gel in accordance with the present invention.

(Step S1 of Forming Polymer Film)

Step S1 of forming a polymer film is a step which includes preparing the organic-metallic hybrid polymer solution, coating the organic-metallic hybrid polymer solution onto a flat surface, and then drying thereof, thereby forming a polymer film consisting of an organic-metallic hybrid polymer to a thickness of less than 1 μm.

Firstly, the organic-metallic hybrid polymer is dissolved in an organic solvent to prepare the organic-metallic hybrid polymer solution.

As the organic solvent, one having a boiling point of 120 to 300° C. is used. Examples of such organic solvents may be propylene carbonate, ethylene carbonate, ethyl methyl carbonate, diethyl carbonate, dimethyl carbonate, butylene carbonate, γ-butyl lactone, tetramethylurea, sulfolane, dimethyl sulfoxide, 1,3-dimethyl-2-imidazolidinone, 2-(N-methyl)-2-pyrrolidinone, hexamethylphosphortriamide, N-methyl propione amide, N,N-dimethylacetamide N-methyl acetamide, N,N-dimethylformamide, N-methylformamide, butyronitrile, propionitrile, acetonitrile, acetylacetone, 4-methyl-2-pentanone, 2-butanol, 1-butanol, 2-propanol, 1-propanol, acetic anhydride, ethyl acetate, ethyl propionate, dimethoxyethane, diethoxy furan, tetrahydrofuran, ethylene dalycol, diethylene glycol, triethylene glycol monobutyl ether, tricresyl phosphate, 2-ethyl hexyl phosphate, dioctyl phthalate, dioctyl sebacate, and the like.

Among them, cyclic carboxylate ester compounds such as propylene carbonate, ethylene carbonate, ethyl methyl carbonate, diethyl carbonate, dimethyl carbonate, butylene carbonate, and γ-butyl lactone is preferably used.

As the organic solvent, a mixed solvent obtained by mixing these organic solvents at a mixing molar ratio of 1:10 to 10:1 may be used.

Next, a substrate having a flat surface is prepared. Examples of the substrate include a glass sheet, a plastic sheet, ITO or metal sheet.

Next, as shown in FIG. 2(*a*), the organic-metallic hybrid polymer solution is coated on a flat surface 21*a* of the substrate 21 and then dried so as to form a polymer film 22 including the organic-metallic hybrid polymer to a thickness of less than 1 μm. Immediately after formation, the organic-metallic hybrid polymer of the polymer film 22 is not oxidized, and the polymer film 22 has a blue color.

Examples of the coating method include a spin coating method and a dipping method. Coaters such as an applicator or a spin coating apparatus may be used.

After coating, by leaving the coated product for 20 min at room temperature, for example, the organic-metallic hybrid polymer solution is dried.

It is preferable that the thickness of the polymer film 22 is less than 1 μm. When the thickness of the polymer film 22 is more than 1 μm, the organic-metallic hybrid polymer may not contain the electrolyte-containing gel completely in a step of forming the organic-metallic hybrid polymer-containing layer.

(Step S2 of Coating Electrolyte-Containing Coarting Gel)

Step S2 of coating the electrolyte-containing coarting gel is a process of preparing an electrolyte-containing coarting gel, and then coating the electrolyte-containing coarting gel onto one surface of the polymer film to a thickness of not less than 10 μm and not more than 1 cm.

Firstly, the inorganic electrolyte is dissolved in an organic solvent to prepare the inorganic electrolyte solution.

The inorganic electrolyte is any one of lithium salt, sodium salt, potassium salt, ammonium salt and the compounds thereof. The organic solvent is any one of propylene carbonate, ethylene carbonate, and diethyl carbonate.

For example, an inorganic electrolyte including 1.0 g of $LiClO_4$ is dissolved in 10 ml of an organic solvent of propylene carbonate.

Next, the electrolyte-containing coarting gel is prepared by adding a polymer to the inorganic electrolyte solution to gell the solution and stirring.

The polymer for gelling is any one of poly(methacrylic acid ester)s such as poly(methyl methacrylate), poly(ethyl methacrylate), poly(butyl methacrylate), poly(cyclohexyl methacrylate), poly(phenyl methacrylate), and polycarbonates.

For example, 10 g of poly(methyl methacrylate) (PMMA) is added to the above-mentioned inorganic electrolyte solution and stirred for 1.5 hours.

It is preferable that the electrolyte-containing coarting gel is prepared so that an amount of the organic solvent in the electrolyte-containing coarting gel is not more than 65 weight %. Furthermore, it is preferable that the electrolyte-containing coarting gel is prepared so that the amount of the organic solvent in the electrolyte-containing coarting gel is 30 weight % or more. Thus, not liquid gel but highly viscous electrolyte-containing coarting gel can be prepared.

Next, as shown in FIG. 2(b), the electrolyte-containing coating gel 23 is coated on the flat surface 22a of the polymer film 22. The coated electrolyte-containing coating gel 23 is transparent.

Examples of the coating method include a spin coating method and a dipping method.

It is preferable that the thickness of the electrolyte-containing gel coating 23 is 10 μm or more and 1 cm or less. Thus, even when the organic-metallic hybrid polymer-containing layer habing the organic-metallic hybrid polymer in the electrolyte-containing gel is formed, the electrolyte-containing gel layer consisting only of an electrolyte-containing gel can be allowed to remain.

The electrolyte-containing coating gel 23 is formed immediately after the polymer film 22 is formed. Thus, the organic-metallic hybrid polymer can be efficiently contained in electrolyte-containing gel.

(Step S3 of Forming Organic-Metallic Hybrid Polymer-Containing Layer)

Step S3 a process for forming the organic-metallic hybrid polymer-containing layer 12 containing an organic-metallic hybrid polymer in an electrolyte-containing ge, which comprises maintaining a laminated body of the polymer film 22 and the electrolyte-containing coating gel 23 at room temperature in the air so as to volatilize a predetermined amount of the organic solvent in the electrolyte-containing coating gel 23, and immersing the polymer film 22 into the other surface 23b side of the electrolyte-containing coating gel 23.

Specifically, as shown in FIG. 2(c), the other substrate 27 is disposed on one surface 23a of the electrolyte-containing coating gel 23 such that it is closely brought into contact with the flat surface. Thus, the one surface 23a of the electrolyte-containing coating gel 23 can be made to be flat.

The other substrate 27 and the substrate 21 are made of the same material.

The thus obtained laminated body of the polymer film 22 and the electrolyte-containing gel 23 is maintained at room temperature (10 to 40° C.) in the air, and thus, a predetermined amount of the organic solvent in the electrolyte-containing coating gel 23 can be volatilized, and the polymer film 22 can be immersed into the other surface side of the electrolyte-containing gel coating 23. Thus, the organic-metallic hybrid polymer can be contained in the electrolyte-containing gel, and thus the organic-metallic hybrid polymer-containing layer 12 can be formed.

For example, the two substrates 21 and 27 are removed after they are maintained for 1 to 2 weeks at room temperature in the air. Thus, as shown in FIG. 2(d), it is possible to produce the electrochromic gel 11 in which the electrolyte-containing gel layer 13 consisting only of an electrolyte-containing gel is laminated on the organic-metallic hybrid polymer-containing layer 12 comprising the electrolyte-containing gel containing an organic-metallic hybrid polymer.

<Method for Controlling Electronic Printing and Erasing on Electrochromic Gel>

The method for controlling electronic printing and erasing on the electrochromic gel in accordance with the embodiment of the present invention is a process which comprises connecting a first electrode to the organic-metallic hybrid polymer-containing layer and connecting a second electrode to the electrolyte-containing gel layer, then applying an electric field between the two electrodes so as to oxidize and reduce the organic-metallic hybrid polymer in a region of the electrolyte-containing gel layer to which the first electrode is connected, so that oxidization de-colors the region and reduction colors the region, thereby carrying out the electronic printing and the erasing.

Figure 3:
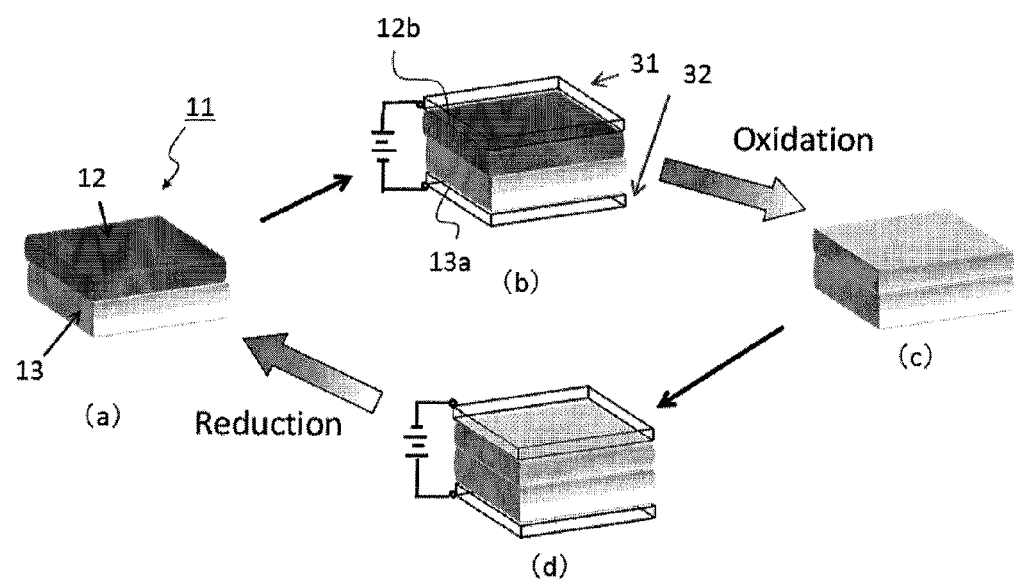
FIG. 3 is a process chart showing one example of a method for controlling electronic printing and erasing on the electrochromic gel of the present invention.

FIG. 3 is a process chart showing one example of a method for controlling electronic printing and erasing on the electrochromic gel in accordance with the present invention.

Firstly, as shown in FIG. 3(a), the electrochromic gel 11 is prepared, in which the electrolyte-containing gel layer 13 consisting only of an electrolyte-containing gel is laiminated on the organic-metallic hybrid polymer-containing layer 12 which comprises the electrolyte-containing gel containing an organic-metallic hybrid polymer. In this state, the organic-metallic hybrid polymer-containing layer 12 has a blue color.

Next, as shown in FIG. 3(b), the first electrode 31 is connected to the organic-metallic hybrid polymer-containing layer 12, and at the same time the second electrode 32 is connected to the electrolyte-containing gel layer 13.

For the two electrodes 31 and 32, a metal plate can be used. These are brought into contact with each layer.

Next, an electric field is applied between two electrodes 31 and 32 with the direction and magnitude controlled.

Applying he electric field in such a manner that the organic-metallic hybrid polymer-containing layer 12 being positive and the electrolyte-containing gel layer 13 being negative, the organic-metallic hybrid polymer can be oxidized, and coloring can be carried out from blue to transparent.

A voltage value is, for example, 3.5 V.

Furthermore, it is preferable that at the application of the electric field, the electrochromic gel is pressed in a direction in which the distance between the electrodes is shortened. Thus, the reaction time can be shortened.

Next as shown in FIG. 3(c), by removing the two electrodes 31 and 32, the organic-metallic hybrid polymer is oxidized and the organic-metallic hybrid polymer-containing layer 12 of the electrochromic gel is decolored.

Next as shown in FIG. 3(d), the first electrode 31 is connected to the organic-metallic hybrid polymer-containing layer 12, and at the same time the second electrode 32 is connected to the electrolyte-containing gel layer 13.

Next, by applying the electric field in such a manner that the organic-metallic hybrid polymer-containing layer 12 being negative and the electrolyte-containing gel layer 13 being positive, the organic-metallic hybrid polymer can be reduced, and coloring can be carried out from transparent to blue.

A voltage value is, for example, 3.5 V.

Furthermore, it is preferable that at application of the electric field, the electrochromic gel is pressed in a direction in which the distance between the electrodes is shortened. Thus, the reaction time can be shortened.

Next as shown in FIG. 3(a), by removing the two electrodes 31 and 32, the organic-metallic hybrid polymer is reduced and the organic-metallic hybrid polymer-containing layer 12 of the electrochromic gel in which is colored.

Note here that by leaving the electrochromic gel for several days, the organic-metallic hybrid polymer is oxidized, and the organic-metallic hybrid polymer-containing layer 12 is decolored.

Coloring and decoloring of the organic-metallic hybrid polymer is based on absorption of the charge transfer (MLCT) from metal ions $M^1$ to $M^N$ to a bis(terpyridine) derivative as a ligand.

The organic-metallic hybrid polymer 18 is decolored when it is electrochemically oxidized, and is colored when the organic-metallic hybrid polymer 18 is electrochemically reduced in the decolored state. This phenomenon can be generated repeatedly.

In the chemical formula (I), the metal ions $M^1$ to $M^N$ are different from each other (specifically, for example, an iron ion, a cobalt ion, a nickel ion, a zinc ion, and the like), the organic-metallic hybrid polymer can carry out a plurality of coloring (see Patent Literatures 1 and 3).

Figure 4:
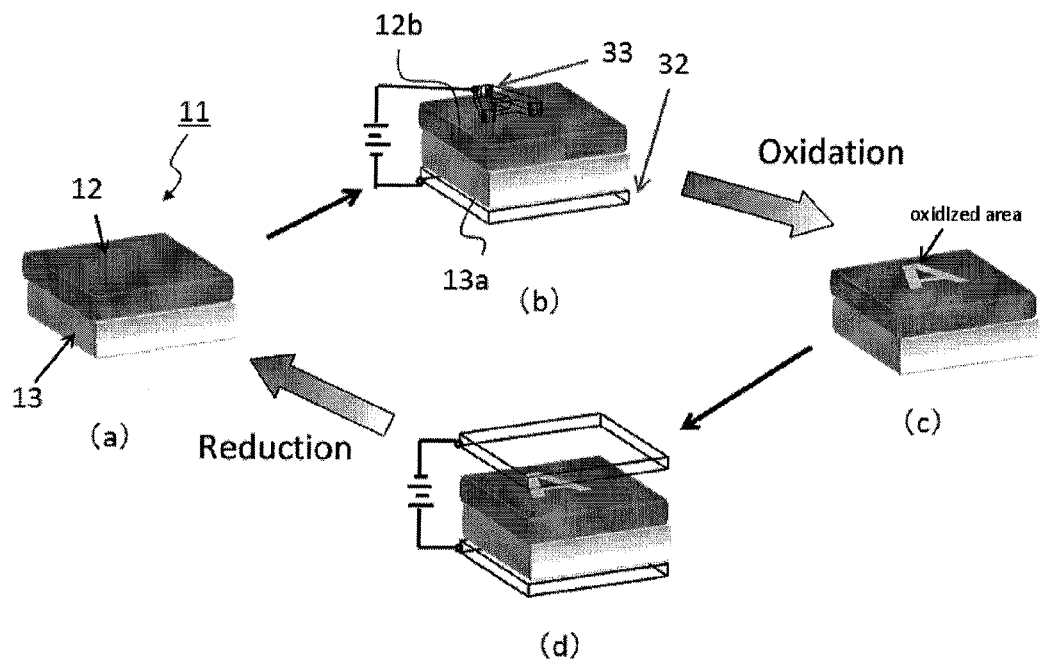
FIG. 4 is a process chart showing another example of a method for controlling electronic printing and erasing on the electrochromic gel of the present invention.

FIG. 4 is a process chart showing another example of a method for controlling electronic printing and erasing on the electrochromic gel in accordance with the present invention.

This process is the same as that in FIG. 3 except that when the organic-metallic hybrid polymer is oxidized, a metal plate which has been processed in an alphabet "A" shape as shown in FIG. 4(b) is used for the first electrode.

According to the shape of the first electrode, an oxidized region of the organic-metallic hybrid polymer-containing layer 12 is determined, and as sown in FIG. 4(c), an alphabet "A" shaped decolored region is formed in the organic-metallic hybrid polymer-containing layer 12.

Thus, in electronic printing, a transparent decolored region in a blue colored region as a background can be made to be an information display part, but an information display part may have the contrary configuration. That is, a blue colored region in a transparent decolored region may be an information display part.

<Stretchable Display>

A stretchable display in accordance with the embodiment of the present invention comprises the electrochromic gel 11 of the embodiment of the present invention, a bendable frame holding the electrochromic gel 11, and a band attached to the frame.

FIGS. 5(a) and 5(b) are views showing one example of a stretchable display of the present invention. FIG. 5(a) is a plan view thereof, and FIG. 5(b) is a side view thereof.

Figure 5:
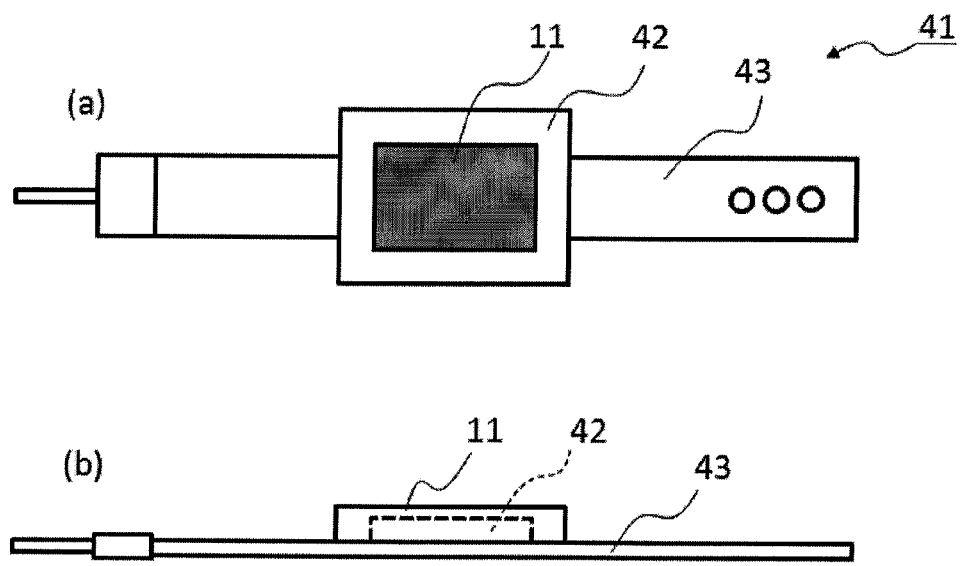
FIG. 5 is a view showing one example of a stretchable display of the present invention.

As shown in FIG. 5, the stretchable display 41 in accordance with an embodiment of the present invention comprises the electrochromic gel 11, a bendable frame 42 holding the electrochromic gel 11, and a band 43 attached to the frame 42. The band 43 may employ one made of bendable material.

Not only the frame 42 is capable of bending, but also the electrochromic gel 11 is excellent in flexibility and is stretchable. Therefore, not only the band 43 but also the frame 42 and the electrochromic gel 11 as a display can be attached and fitted to the curved line of human body.

The electrochromic gel 11 of in accordance with an embodiment of the present invention has a configuration in which the electrolyte-containing gel layer 13 consisting only of an electrolyte-containing gel is laminated on the organic-metallic hybrid polymer-containing layer 12 which comprises the electrolyte-containing gel containing an organic-metallic hybrid polymer, it can carry out electronic printing and erasing on the electrochromic gel by reversibly coloring or decoloring the organic-metallic hybrid polymer due to electric field application control. Furthermore, the display of the electronic printing can be maintained for several hours without supplying electric power. Furthermore, an electronic information display medium itself is excellent in flexibility and can be rolled like paper medium. In addition, since it is stretchable, it can be used as a new stretchable electronic information display medium.

Also, since the organic-metallic hybrid polymer represented by the chemical formula (I) uses a plurality of types of metal ions having different redox potential, coloring of a color based on the specific metal ion can be achieved.

In the electrochromic gel 11 in accordance with an embodiment of the present invention, the electrolyte-containing gel has a configuration in which the inorganic electrolyte 17 is dispersed in the polymer gel 16 containing the organic solvent 15, then the electrochromic gel 11 can be made to be an electronic information display medium which is excellent in flexibility and is stretchable.

In the electrochromic gel 11 in accordance with an embodiment of the present invention, the organic-metallic hybrid polymer 18 may have a configuration represented by the chemical formula (I), then the electrochromic gel 11 can carry out electronic printing and erasing on the electrochromic gel by reversibly coloring or decoloring the organic-metallic hybrid polymer by electric field application control. Furthermore, the display of the electronic printing can be maintained for several hours without supplying electric power.

In the electrochromic gel 11 in accordance with an embodiment of the present invention, since the organic-metallic hybrid polymer 18 may be an Fe-MEPE polymer, the electrochromic gel 11 can carry out electronic printing or erasing on the electrochromic gel by reversibly coloring or decoloring the organic-metallic hybrid polymer by electric field application control. Furthermore, the display of the electronic printing can be maintained for several hours without supplying electric power.

In the electrochromic gel 11 in accordance with an embodiment of the present invention, since the inorganic electrolyte 17 may have electrolytic conductivity of 0.2 S/m or more, the electrochromic gel 11 can carry out electronic printing and erasing on the electrochromic gel by reversibly coloring or decoloring the organic-metallic hybrid polymer by electric field application control. Furthermore, the display of the electronic printing can be maintained for several hours without supplying electric power.

In the electrochromic gel 11 in accordance with an embodiment of the present invention, since the inorganic electrolyte 17 may be any one of lithium salt, sodium salt, potassium salt, ammonium salt or compounds thereof, the electrochromic gel 11 can carry out electronic printing or erasing by reversibly coloring or decoloring the organic-metallic hybrid polymer by electric field application control.

Furthermore, the display of the electronic printing can be maintained for several hours without supplying electric power.

In the electrochromic gel 11 in accordance with an embodiment of the present invention, since the polymer 14 constituting the polymer gel 16 may be any one of poly (methacrylic acid ester)s such as poly(methyl methacrylate), poly(ethyl methacrylate), poly(butyl methacrylate), poly(cyclohexyl methacrylate), and poly(phenyl methacrylate), and polycarbonates, an electronic information display medium which is excellent in flexibility and which is stretchable can be formed.

In the electrochromic gel 11 in accordance with an embodiment of the present invention, since the organic solvent 15 is any one of propylene carbonate, ethylene carbonate, and diethyl carbonate, it is possible to form an electronic information display medium which is excellent in flexibility and which is stretchable.

A method for producing the electrochromic gel 11 in accordance with an embodiment of the present invention comprises a step of forming a polymer film consisting of an organic-metallic hybrid polymer to a thickness of less than 1 µm, in which an organic-metallic hybrid polymer solution is prepared, the organic-metallic hybrid polymer solution is coated onto a flat surface, and the solution is dried, a step of coating an electrolyte-containing gel onto one surface of the polymer film to a thickness of not less than 10 µm and not more than 1 cm, in which an electrolyte-containing coating gel including an organic solvent is prepared and is coated onto the polymer film, and a step of forming an organic-metallic hybrid polymer-containing layer comprising the electrolyte-containing gel and the organic-metallic hybrid polymer contained in said gel, in which a laminated body of the polymer film and the electrolyte-containing gel is maintained at room temperature in the air so as to volatilize a predetermined amount of the organic solvent in the electrolyte-containing coating gel, and the polymer film is inmmersed into the other surface side of the electrolyte-containing coating gel. Therefore, the electrochromic gel of the present invention can be easily produced.

In a method for producing the electrochromic gel 11 in accordance with an embodiment of the present invention, the electrolyte-containing coating gel may be prepared by dispersing a polymer of any one of poly(methacrylic acid ester)s such as poly(methyl methacrylate), poly(ethyl methacrylate), poly(butyl methacrylate), poly(cyclohexyl methacrylate), and poly(phenyl methacrylate), and polycarbonates, and an inorganic electrolyte which is any one of lithium salt, sodium salt, potassium salt, ammonium salt or compounds thereof into an organic solvent of any one of propylene carbonate, ethylene carbonate, and diethyl carbonate. Then, the electrochromic gel of the present invention can be easily produced.

In the electrochromic gel 11 in accordance with an embodiment of the present invention, since the electrolyte-containing coating gel may be produced so that the amount of the organic solvent in the electrolyte-containing coating gel is 65 weight % or less, an electrolyte-containing gel having high viscosity can be formed and an organic-metallic hybrid polymer-containing layer can be formed only one surface side of the electrolyte-containing gel.

A method for controlling electronic printing and erasing on an electrochromic gel in accordance with an embodiment of the present invention is a control of electronic printing and erasing on the above-mentioned electrochromic gel, which comprises connecting a first electrode to the organic-metallic hybrid polymer-containing layer and connecting a second electrode to the electrolyte-containing gel layer, then applying an electric field between the two electrodes so as to oxidize and reduce the organic-metallic hybrid polymer in a region of the electrolyte-containing gel layer to which the first electrode is connected, so that oxidization de-colors the region and reduction colors the region, thereby carrying out the electronic printing and erasing. Therefore, the organic-metallic hybrid polymer can be easily colored or decolored, thereby carrying out electronic printing and erasing on the electrochromic gel. Furthermore, coloring or decoloring is carried out according to the electrode pattern shape, thus enabling patterns to be transferred easily.

The stretchable display in accordance with an embodiment of the present invention comprises the electrochromic gel 11, a bendable frame holding the electrochromic gel 11, and a band attached to the frame. Then, not only the band but also the frame and the electrochromic gel itself as a display can be attached and fitted to the curved line of human body.

The electrochromic gel, the method for producing the gel, the method for controlling electronic printing and erasing on the electrochromic gel, and the stretchable display of the present invention are not limited to the above-mentioned embodiment, they can be carried out by variously modifying in the scope of the technical idea of the present invention. Specific examples of the present embodiments are show in the following Examples. However, the present invention is not limited to these Examples.

EXAMPLES

Example 1

<Production of Electrochromic Gel>

Firstly, a solution is prepared by complexing bis (terpyridyl)benzene and an iron ion to obtain an organic-metallic hybrid polymer (Fe-MEPE polymer), and dissolving the organic-metallic hybrid polymer in an organic solvent.

For the organic solvent, a mixed solvent including methanol and 2-propanol was used. The mixing molar ratio was made to be 1:1.

Next, by using a spin coating method or an applicator, a Fe-MEPE polymer solution was coated on one surface of a glass substrate, and the coated product was dried at room temperature for 20 min so as to provide a uniform blue Fe-MEPE polymer film (polymer membrane) having a thickness of about 500 nm.

Next, 1.0 g of $LiClO_4$ was dissolved in 10 ml of propylene carbonate to prepare a $LiClO_4$-propylene carbonate solution (electrolytic conductivity: 10 S/m).

Next, 10 g of polymethylmethacrylate) (PMMA) was added to the $LiClO_4$-propylene carbonate solution, the solution was stirred for 1.5 hours to produce transparent gel electrolyte (electrolyte-containing gel for coating). An amount of propylene carbonate in the gel electrolyte was 45 weight %.

Next, the gel electrolyte was casted on one surface of the Fe-MEPE polymer film to a thickness of about 1 mm. Thus, a laminated body in which the gel electrolyte was laminated on the Fe-MEPE polymer film was formed.

Next, a glass substrate was disposed on one surface of each gel electrolyte of the laminated body, and they were maintained at room temperature in the air for two weeks, and then two glass substrates were removed. In the maintaining state, a blue Fe-MEPE polymer film was immersed into the other surface side of the transparent gel electrolyte, and the layer containing the Fe-MEPE polymer in the gel electrolyte (organic-metallic hybrid polymer-containing layer) was formed.

The above steps produced an electrochromic gel having a two-layered structure composed of a layer consisting only of gel electrolyte (electrolyte-containing gel layer) and a layer in which an organic-metallic hybrid polymer is contained in the gel electrolyte (organic-metallic hybrid polymer-containing layer).

<Evaluation of Whole Surface Printing (Information Writing) and Erasing on Electrochromic Gel>

Firstly, electrodes were connected to the whole surface of each of a layer containing a blue Fe-MEPE polymer in gel electrolyte and a layer consisting only of gel electrolyte, and 3.5 V was applied so that the layer containing the Fe-MEPE polymer in gel electrolyte being positive and the a layer consisting only of gel electrolyte being negative, so that the electrochromic gel was pressed in a direction in which the distance between the electrodes was shortened. Thus, the blue Fe-MEPE polymer was oxidized, and the whole surface of the layer containing the Fe-MEPE polymer in gel electrolyte became transparent.

After the electrodes had been removed, the transparent state was maintained for five days.

Next, electrodes were connected to the whole surface of each of the layer containing the Fe-MEPE polymer and the layer consisting only of gel electrolyte, and 3.5 V was applied so that the layer containing the Fe-MEPE polymer being negative and the a layer consisting only of gel electrolyte being positive, and the electrochromic gel was pressed in a direction in which the distance between the electrodes was shortened. Thus, a transparent Fe-MEPE polymer was reduced and the whole surface of the layer containing the Fe-MEPE polymer in gel electrolyte became blue.

After the electrodes had been removed, the transparent state was maintained for five days.

The oxidization and reduction were reversibly reproduced.

Figure 6:
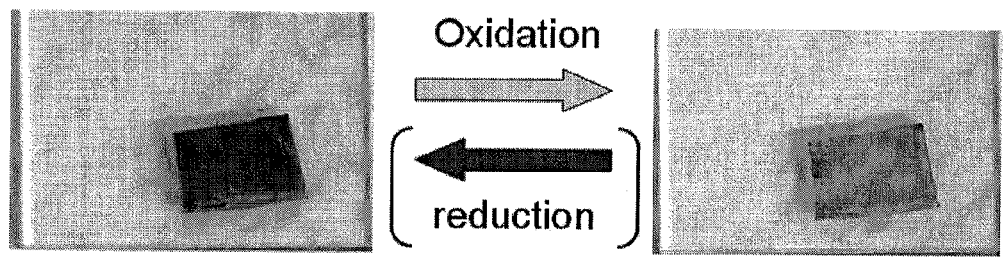
FIG. 6 is a photograph showing states before and after oxidation of a sample of Example 1.

FIG. 6 is a photograph showing states before and after oxidation. Note here that before and after reduction, color change from transparent to blue was observed.

Figure 7:
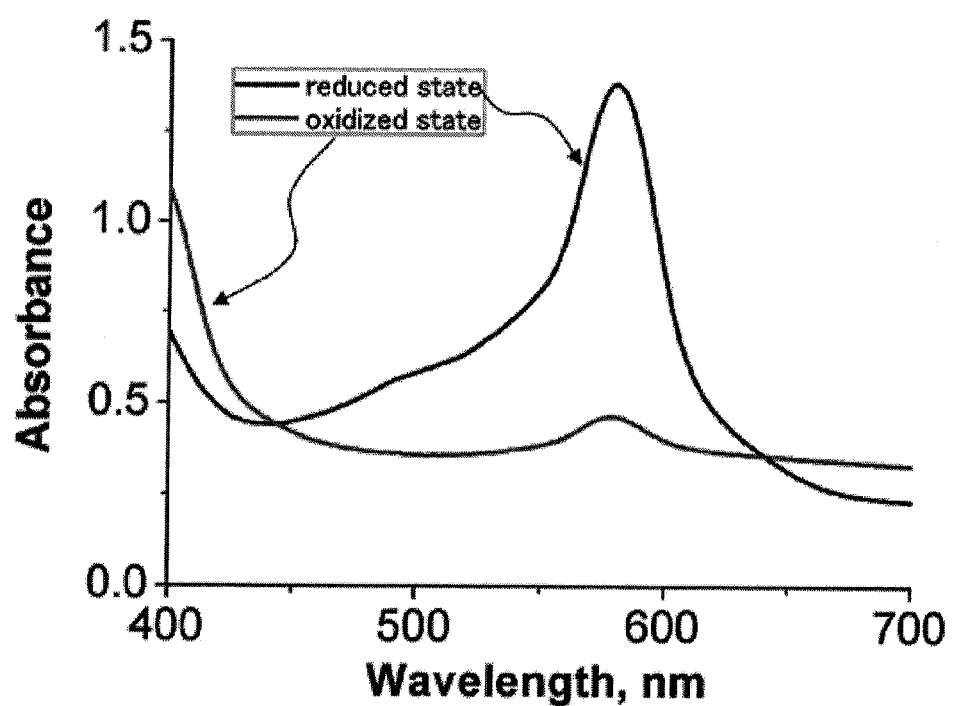
FIG. 7 shows an absorption spectrum of the oxidized state and the reduced state of a sample of Example 1.

FIG. 7 shows a UV-visible light absorption spectrum of the electrochromic gel. As shown in FIG. 7, in the reduction state, an absorption peak was observed in the wavelength of 580 nm. Also in the oxidization state, a slight peak was observed in the wavelength of 580 nm, but it disappeared.

Figure 8:
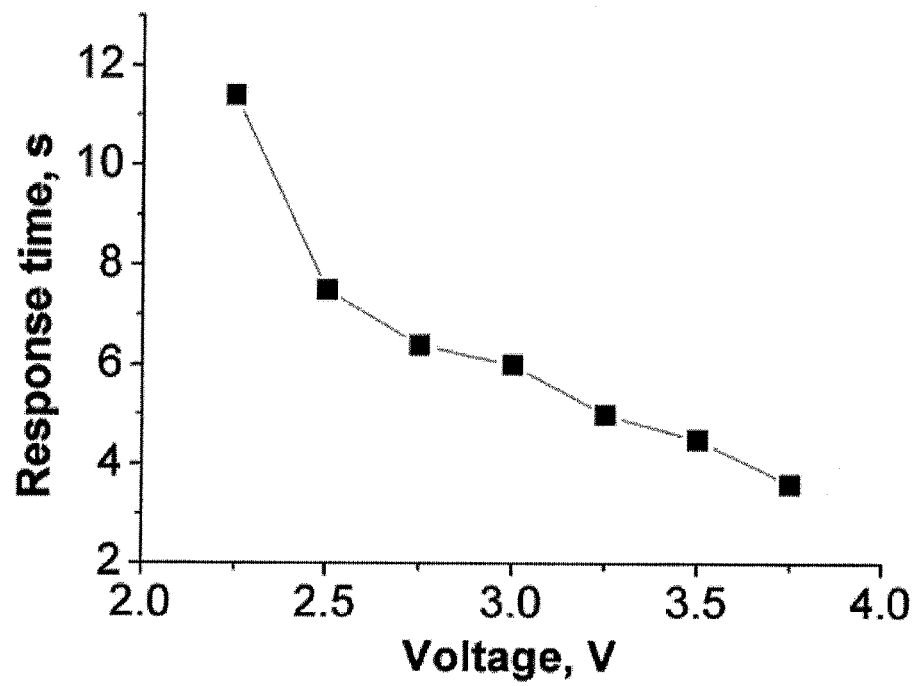
FIG. 8 is a graph showing voltage-dependent property of a sample of Example 1 in the reaction time.

FIG. 8 is a graph showing a relation between the applied voltage value and the reaction time in the oxidization of the electrochromic gel. The reaction time was made to be a time at which the absorbance in the wavelength of 580 nm became 0.5. When the applied voltage value was 3.75 V, the whole surface of the layer containing the Fe-MEPE polymer in the gel electrolyte was oxidized for four seconds.

Figure 9:
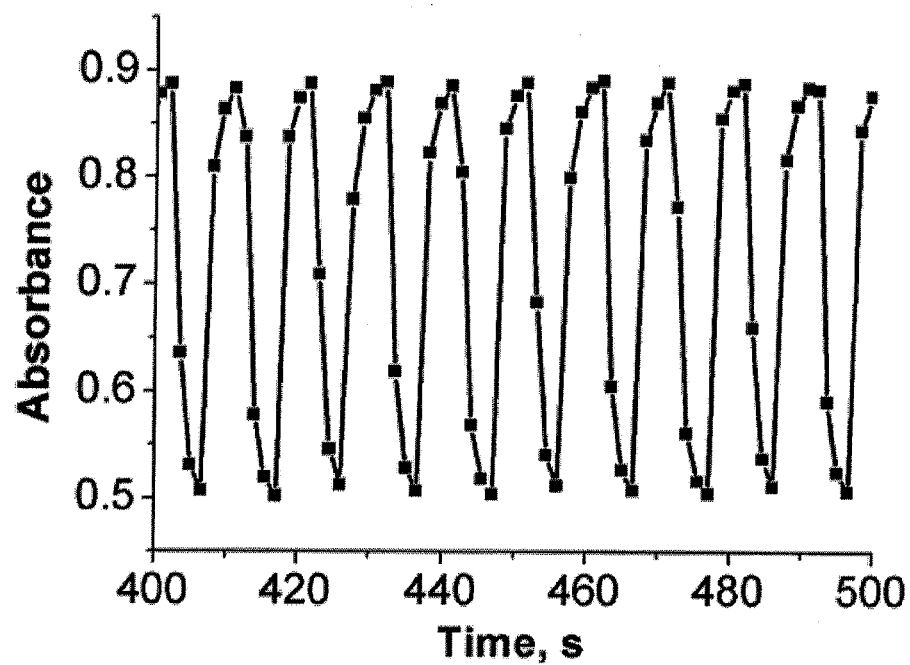
FIG. 9 is a graph showing reproducibility of the absorption spectrum of a sample of Example 1.

FIG. 9 is a graph showing the time course of the absorbance in the wavelength of 580 nm when oxidization of an applied voltage value of 3 V and voltage applying time of 5 s and reproduction of an applied voltage value of −1.7 V and voltage applying time of 5 s were repeated. As shown in FIG. 9, the absorbance of the electrochromic gel showed high reproducibility according to the oxidization and reproduction.

Figure 10:
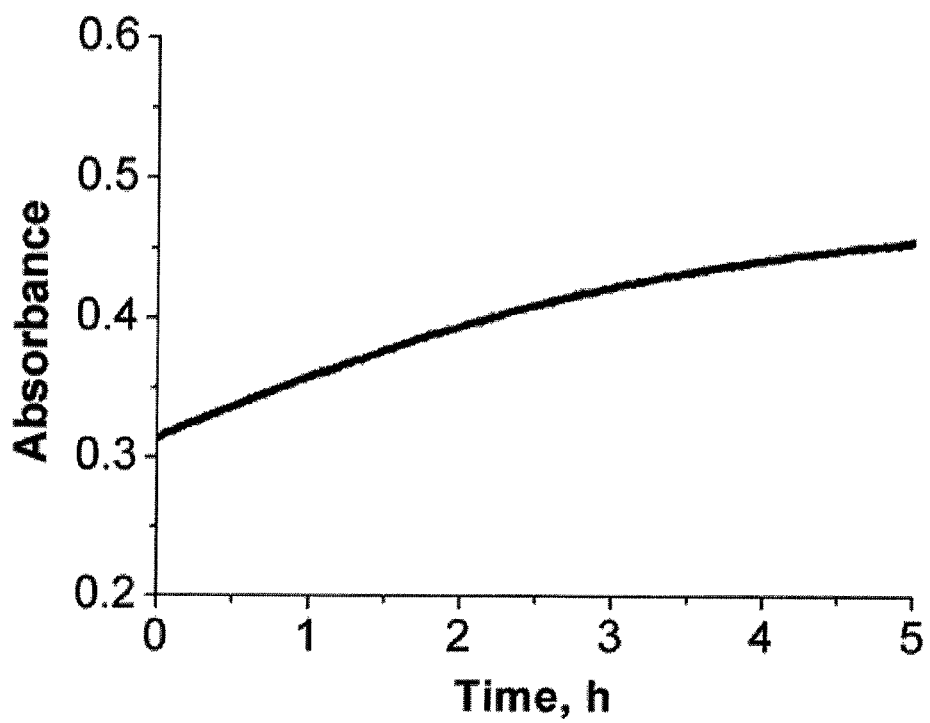
FIG. 10 is a graph showing stability of the absorption spectrum of a sample of Example 1.

FIG. 10 is a graph showing the time course of the absorbance after oxidization. As shown in FIG. 10, the absorbance in the wavelength of 580 nm after oxidization was 0.32 and the value was 0.45 even after five hours. The absorbance of the electrochromic gel after oxidization was maintained for several hours without supplying electric power.

<Evaluation of Partial Printing (Information Writing) and Erasing on Electrochromic Gel>

Evaluation was carried out by the same method as in the evaluation of whole surface printing and erasing on an electrochromic gel except that at the oxidation of a Fe-MEPE polymer, a metal plate, which had been processed into an alphabet "T" shape, was used for electrode to be connected to the layer containing the Fe-MEPE polymer in gel electrolyte.

Figure 11:
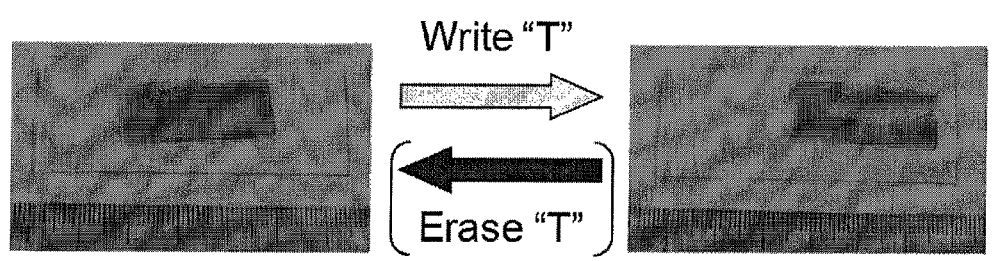
FIG. 11 is a photograph showing states before and after oxidation of a sample of Example 2.

FIG. 11 is a photograph showing an electrochromic gel before and after oxidization when the metal plate, which had been processed into an alphabet "T" shape, was used for electrode was used.

According to the shape of the contact site of the electrodes, the oxidized region is formed in the layer containing the Fe-MEPE polymer in gel electrolyte, and as shown in FIG. 11, an alphabet "T" shaped decolored region is formed. Note here that before and after reduction, change in which the alphabet "T" shaped decolored region became a blue colored region was observed.

INDUSTRIAL APPLICABILITY

The present invention relates to an electrochromic gel which is excellent in flexibility and is stretchable, a method for producing the gel and a method for controlling electronic printing and erasing. The electrochromic gel is an electronic paper display capable of being rolled like paper and is applicable for display industry, optical device industry, optical information industry, and the like.

REFERENCE SIGNS LIST

11 . . . electrochromic gel
12 . . . organic-metallic hybrid polymer-containing layer
12a . . . first surface
12b . . . second surface
13 . . . electrolyte-containing gel layer
13a . . . first surface
13b . . . second surface
14 . . . polymer
15 . . . organic solvent
16 . . . polymer gel
17 . . . inorganic electrolyte
18 . . . organic-metallic hybrid polymer
21 . . . substrate
21a . . . one surface
22 . . . polymer film
23 . . . electrolyte-containing coating gel
27 . . . substrate
31, 32 . . . electrode
41 . . . stretchable display
42 . . . frame
43 . . . band

The invention claimed is:

1. An electrochromic gel comprising:
   an electrolyte-containing gel layer consisting only of the electrolyte-containing gel, wherein the electrolyte-containing gel comprises a polymer gel containing an organic solvent and an inorganic electrolyte dispersed into said polymer gel; and
   an organic-metallic hybrid polymer-containing layer which comprises an organic-metallic hybrid polymer contained in the electrolyte-containing gel, wherein the electrolyte-containing gel layer and the organic-metallic hybrid polymer-containing layer are laminated onto each other with the electrolyte-containing gel being shared by the electrolyte-containing gel layer and the organic-metallic hybrid polymer-containing layer, and wherein the electrochromic gel itself is stretchable, wherein the organic-metallic hybrid polymer is represented by the following formula (I):

[Chemical Formula 1]

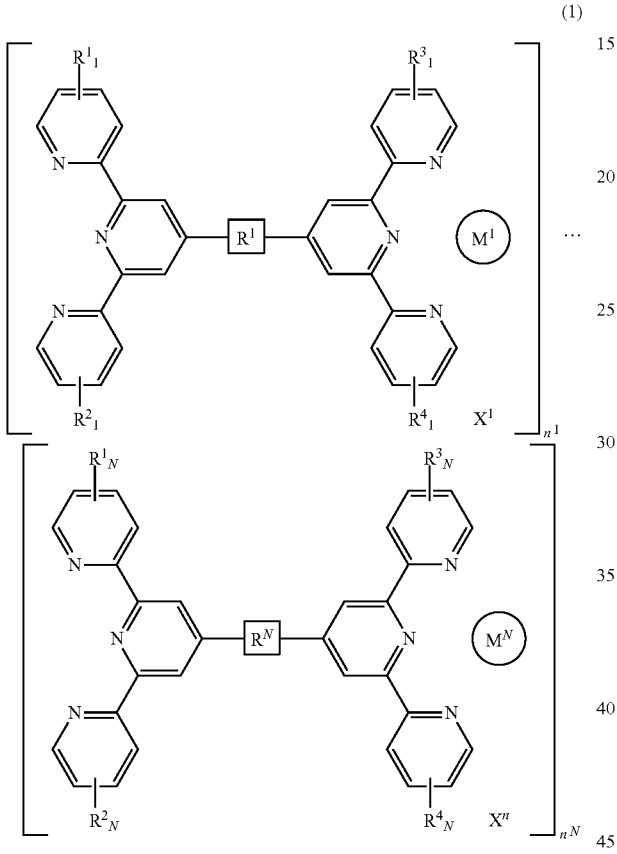

(1)

wherein $M^1$ to $M^N$ denote a plurality of types of metal ions having different oxidation-reduction potential from each other, and N denotes an integer of 2 or more, wherein $X^1$ to $X^n$ denote, independently for each occurrence, a counter anion, and n denotes an integer of 2 or more, wherein $R^1$ to $R^N$ denote, independently for each occurrence, a spacer including a carbon atom and a hydrogen atom or a spacer directly connecting two terpyridyl groups to each other, and N denotes an integer of 2 or more, wherein $R^1_1$ to $R^1_N$, $R^2_1$ to $R^2_N$, $R^3_1$ to $R^3_N$, and $R^4_1$ to $R^4_N$ denote, independently for each occurrence, a hydrogen atom or a substituent group, and N denotes an integer of 2 or more, and wherein $n^1$ to $n^N$ denote an integer of 2 or more showing independently a polymerization degree, wherein the organic-metallic hybrid polymer-containing layer has a thickness of less than 1 μm, and wherein the electrolyte-containing gel layer and the organic-metallic hybrid polymer-containing layer have a total thickness of not less than 10 μm and not more than 1 cm.

2. The electrochromic gel of claim 1, wherein the organic-metallic hybrid polymer is a Fe-MEPE polymer.

3. The electrochromic gel of claim 1, wherein the inorganic electrolyte has electrolytic conductivity of 0.2 S/m or more.

4. The electrochromic gel of claim 3, wherein the inorganic electrolyte is any one of lithium salt, sodium salt, potassium salt, ammonium salt or compounds thereof.

5. The electrochromic gel of claim 1, wherein a polymer constituting the polymer gel is any one of poly(methacrylic acid ester)s and polycarbonates.

6. The electrochromic gel of claim 1, wherein the organic solvent is any one of propylene carbonate, ethylene carbonate, and diethyl carbonate.

7. A method for producing an electrochromic gel according to claim 1, which comprises:

Step S1 of forming a polymer film consisting of an organic-metallic hybrid polymer to a thickness of less than 1 μm, in which an organic-metallic hybrid polymer solution is prepared, the organic-metallic hybrid polymer solution is coated onto a flat surface, and the solution is dried, Step S2 of coating an electrolyte-containing gel comprising a polymer gel containing an organic solvent and an inorganic electrolyte dispersed into said polymer gel onto one surface of the polymer film to a thickness of not less than 10 μm and not more than 1 cm, in which an electrolyte-containing coating gel comprising the polymer gel containing the organic solvent and the inorganic electrolyte dispersed into said polymer gel including an organic solvent is prepared and is coated onto the polymer film, and Step S3 of forming an organic-metallic hybrid polymer-containing layer comprising the electrolyte-containing gel and the organic-metallic hybrid polymer contained in said gel, in which a laminated body of the polymer film and the electrolyte-containing gel is maintained at room temperature in the air so as to volatilize a predetermined amount of the organic solvent in the electrolyte-containing coating gel, and the polymer film is inmmersed into the other surface side of the electrolyte-containing coating gel.

8. The method for producing an electrochromic gel according to claim 7, wherein the electrolyte-containing coating gel including the organic solvent in Step S2 is prepared by dispersing a polymer which is any one of poly(methacrylic acid ester)s and polycarbonates, and an inorganic electrolyte which is any one of lithium salt, sodium salt, potassium salt, ammonium salt or compounds thereof, into an organic solvent which is any one of propylene carbonate, ethylene carbonate, and diethyl carbonate.

9. The method for producing an electrochromic gel according to claim 7, wherein the electrolyte-containing coating gel including the organic solvent in Step S2 is prepared such that an amount of the organic solvent in the electrolyte-containing coating gel is 65 weight % or less.

10. A method for controlling electronic printing and erasing on the electrochromic gel, said electrochromic gel being the electrochromic gel according to claim 1, the method comprising connecting a first electrode to the organic-metallic hybrid polymer-containing layer and connecting a second electrode to the electrolyte-containing gel layer, then applying an electric field between the two electrodes so as to oxidize and reduce the organic-metallic hybrid polymer in a region of the electrolyte-containing gel layer to which the first electrode is connected, so that oxidization de-colors the region and reduction colors the region, thereby carrying out the electronic printing and erasing.

11. A stretchable display comprising:
an electrochromic gel of claim 1;
a bendable frame holding the electrochromic gel, and
a band attached to the frame.

12. The electrochromic gel of claim 5, wherein the poly(methacrylic acid ester) is any one of poly(methyl methacrylate), poly(ethyl methacrylate), poly(butyl methacrylate), poly(cyclohexyl methacrylate), and poly(phenyl methacrylate).

13. The method for producing an electrochromic gel according to claim 8, wherein the poly(methacrylic acid ester) is any one of poly(methyl methacrylate), poly(ethyl methacrylate), poly(butyl methacrylate), poly(cyclohexyl methacrylate), and poly(phenyl methacrylate).

* * * * *